United States Patent [19]

Epina et al.

[11] 4,189,113
[45] Feb. 19, 1980

[54] ISOLATION POCKET FOR RACK MOUNTED TAPE DRIVE

[75] Inventors: August P. Epina; Robert J. Ganter, both of Boulder; James H. Morehouse, Jamestown, all of Colo.

[73] Assignee: Storage Technology Corporation, Louisville, Colo.

[21] Appl. No.: 959,059

[22] Filed: Nov. 9, 1978

[51] Int. Cl.² ............................................. G11B 15/58
[52] U.S. Cl. .................................... 242/182; 226/118; 242/76
[58] Field of Search ............... 242/182, 183, 184, 185, 242/76; 226/95, 118

[56] References Cited

U.S. PATENT DOCUMENTS

| | | | |
|---|---|---|---|
| 3,258,183 | 6/1966 | Weissbach | 242/182 X |
| 3,767,097 | 10/1973 | Watts et al. | 242/182 |
| 3,866,855 | 2/1975 | Bryer | 242/185 |
| 4,093,148 | 6/1978 | Urynowicz | 242/182 |

FOREIGN PATENT DOCUMENTS 1032658  6/1966  United Kingdom ..................... 242/182

Primary Examiner—George F. Mautz
Attorney, Agent, or Firm—Woodcock, Washburn, Kurtz, Mackiewicz & Norris

[57] ABSTRACT

A magnetic tape drive has support arms positioned in the isolation pocket. The arms taper toward the bottom wall of the pocket to provide a mechanical servo action which keeps the tape in the pocket near the steady-state running position. Beaded tape covers the support arms to enhance movement of the tape over the support arms. Low friction bearings at the corner of the opening of the pocket include a barrel roller mounted on roller bearings at the top corner of the opening and a stationary polished barrel at the bottom corner. Alternatively, air bearings are provided.

7 Claims, 6 Drawing Figures

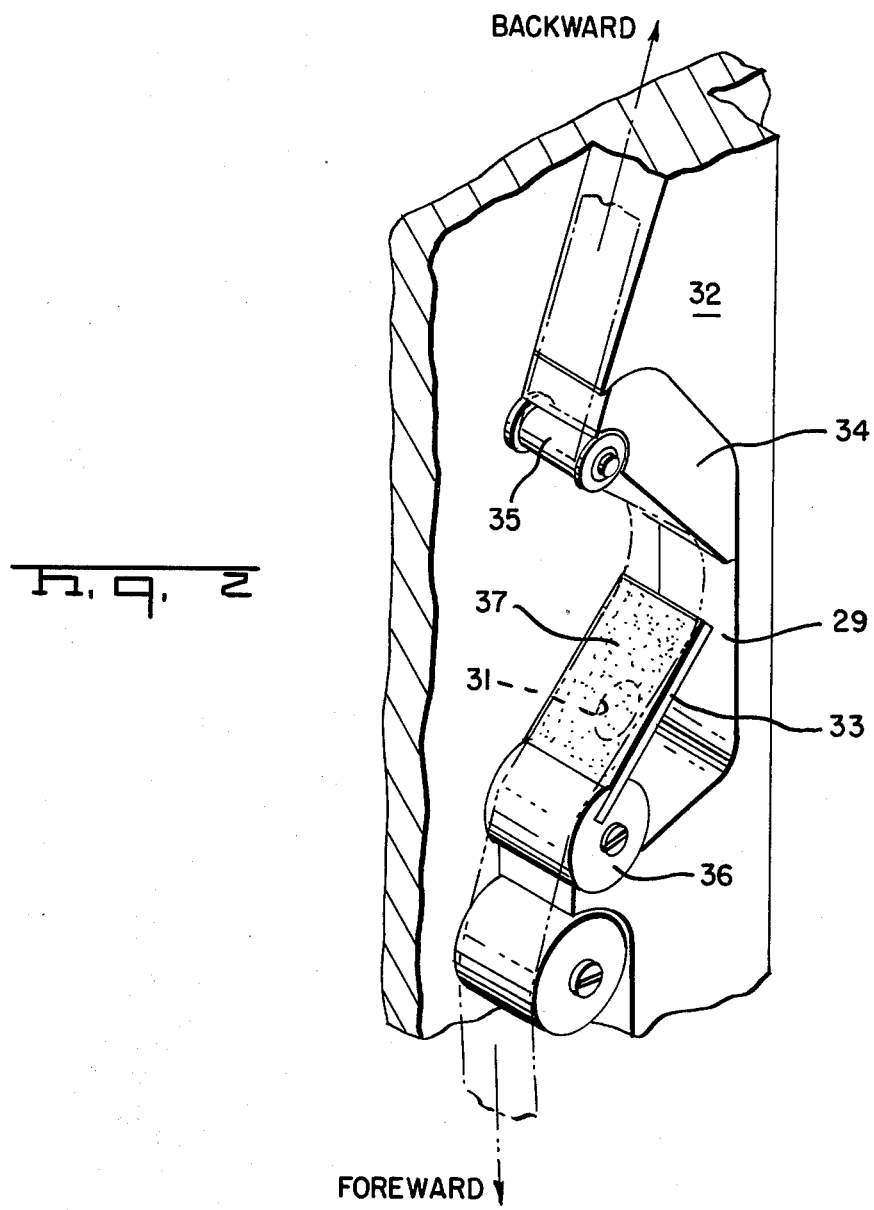
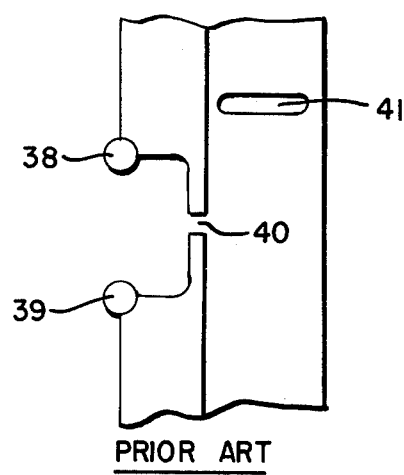
PRIOR ART

ISOLATION POCKET FOR RACK MOUNTED TAPE DRIVE

BACKGROUND OF THE INVENTION

This invention relates to high performance magnetic tape drives for digital data processing systems, and more particularly to a small, rack mounted tape drive.

U.S. Pat. Nos. 3,393,878—Aweida et al and 3,854,674—Herger et al show magnetic tape drives of the type commonly used in digital data processing systems. These tape drives include a supply reel and a take-up reel having parallel axes which are disposed horizontally one with respect to another. The tape drives shown in these patents include tapered isolation pockets, designated 41 in the Aweida et al patent and designated 37 and 38 in the Herger et al patent. These pockets isolate the large amounts of tape from the driving capstan so that the capstan can quickly accelerate and decelerate tape moved past the tape head. The pockets have a wide taper to maintain proper tension on the tape as explained in the first paragraph of column 3 of the Herger et al patent. Because these tape drives are relatively large, there is adequate space in which to provide properly tapered pockets. Recently, smaller rack mounted magnetic tape drives have been used. In these tape drives, the supply and take-up reels are arranged with their axes one above the other and with the threading channel extending vertically between them. The standard size for such rack mounted units is 19" across. Because of limited available space, the geometry of the isolation pocket with respect to the reels is different. Also, only a very limited depth can be provided because of this limited space. The Wangco Mod 14 rack mounted tape drive is one example of a prior art drive of this type.

SUMMARY OF THE INVENTION

In accordance with this invention, support arms are positioned in the isolation pocket to form support surfaces which taper toward the bottom wall of the pocket.

These tapering support surfaces provide a servo action which maintains the position of the tape in the pocket near its steady state running position. This provides a more even tape tension across the head and improves the reproducibility of signal amplitude at the head and inhibits tape slip at the capstan wheel. When the tape is stationary, the vacuum pulls the tape into the isolation pocket to a position at which the forces are in equilibrium. During a forward start, the tape initially moved by the capstan is pulled out of the isolation pocket. Then, after several milliseconds, tape from the supply column builds up enough speed so that it enters the isolation pocket faster than it is leaving. Finally, after several more milliseconds this motion transient dies out and the tape attains a steady-state forward running position.

During a backward start tape is initially pushed into the isolation pocket faster than the supply column can respond, and the backward running position of the tape is momentarily deep in the pocket. Within several milliseconds the tape settles into its steady-state backward running position.

The isolation pocket support arms provide guiding, stabilizing surfaces for the tape when the tape is riding about half-way or deeper in the pocket. The arms act as a mechanical servo to control tape position in the pocket, thus optimizing the isolation pocket performance. As the tape runs deeper into the pocket, less tape area is exposed to vacuum, which results in a reduced force at the pocket. The column, which provides a constant force, pulls the tape out of the pocket, and thus the tape tends to move higher in the pocket seeking equilibrium. If the tape moves too high in the pocket, the force increases in the pocket until tape pulls from the column allowing tape to move deeper in the pocket. Thus the arms stabilize the overall tape motion, which helps to keep the tape tension at the read/write head uniform.

The support arms allow room for a vacuum opening to be positioned beneath one of the arms. This obviates the placing of the vacuum opening at the bottom of the pocket where it might become blocked by tape.

The support surfaces are covered with a glass beaded tape which reduces friction which might otherwise be present because the smooth surface of the tape tends to stick to a smooth surface which supports it.

Low friction, low inertia bearings are provided at the corners of the opening of the pocket. These include a barrel roller mounted on roller bearings at the top corner and a stationary polished barrel at the lower corner. Alternatively, air bearings may be used. The reduction of inertia and friction at these corners is critical in providing even tape tension across the tape head. The low friction, low inertia bearings of this invention provide improved performance over the prior art pins which are typically used. In the tape path of small rack mounted tape drives, the most sensitive tape path location during rapid starts is the upper isolation pocket corner, where only a small amount of drag is acceptable. The isolation pocket roller or air bearing effectively minimizes the drag force at that location. The capstan system is thus not subjected to large forces and changes in force, with the end result being reliable, repeatable starting capability in the tape unit.

The foregoing and other objects, features and advantages of the invention will be better understood from the following more detailed description and appended claims.

DESCRIPTION OF THE DRAWINGS

FIG. 2 shows the isolation pocket in more detail;

FIG. 3 depicts a prior art isolation pocket;

DESCRIPTION OF THE PREFERRED EMBODIMENT

Figure 1:
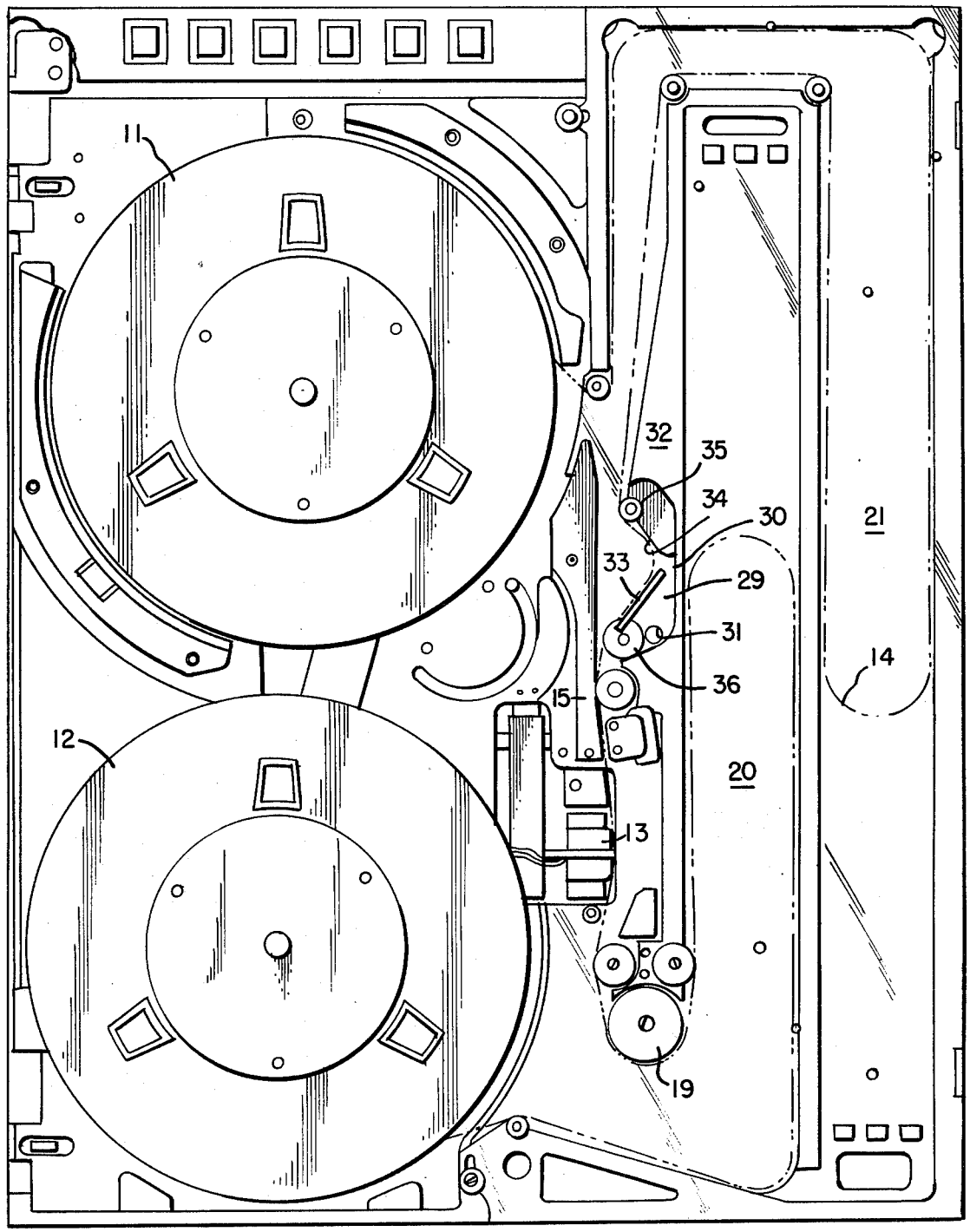
FIG. 1 is a front view of the magnetic tape drive of this invention.

Referring to FIG. 1, a supply reel 11 and a take-up reel 12 rotate on hubs having spaced, parallel axes. A read/write head 13 is mounted intermediate the reels. Magnetic tape follows the path 14 shown in a broken line past the read/write head to the take-up reel 12.

The tape moves past guide 15, sensor 16, cleaner block 17, head 13, fixed guide 18 and capstan 19.

A slack loop of tape is drawn into the vacuum column 20 during loading. Vacuum column 20 has an opening near the take-up reel. Another loop of slack tape is drawn into the vacuum column 21 during loading. Vacuum column 21 has an opening at the top near the supply reel.

Isolation pocket 29 has an opening which faces toward the hubs of supply reel 11 and take-up reel 12. Isolation pocket 29 has a bottom wall 30 and two side walls. A hole 31 in the casting 32 is connected to a source of vacuum which draws a vacuum on the tape in the pocket.

Support arms 33 and 34 are positioned in the pocket to form support surfaces for the magnetic tape. The support arms extend from the corners of the opening of the pocket and taper toward the bottom wall 30.

The support arms provide the required taper in a very shallow pocket. The lower support arm 33 provides room for the vacuum opening 31 so that vacuum can be supplied to the pocket without having an opening at the bottom of the pocket as in the prior art shown in FIG. 3. A glass beaded tape 37 is on the surfaces of the support arms over which the magnetic tape moves.

Two low friction and/or low inertia bearings are positioned at the corners of the opening of the pocket. A barrel roller 35, mounted on roller bearings, is positioned at the top corner of the opening of the pocket. A stationary polished barrel 36 is positioned at the lower corner of the pocket. The large diameter barrel provides a gentle lead-in for the tape to the tape guides and read/write head. The low inertia, low friction roller 35 and barrel 36 greatly reduce the tape path drag force compared to the drag force which is present with a buffer pocket with fixed pins as shown in FIG. 3. The pins 38 and 39 at the corners of the opening of the pocket guide the tape into and out of the pocket, but the drag is typically much greater than with the bearings of the present invention.

As shown in FIG. 3, a hole 40 at the bottom of the pocket extends to the adjacent vacuum column. The casting has a hole 41 which supplies the same vacuum to the vacuum column and to the isolation pocket. The present invention has an advantage over this arrangement in that it is possible to provide a different vacuum level in the isolation pocket than in the vacuum column. Also, in the arrangement shown in FIG. 3, the tape may bottom out in the pocket and cover the hole 40. This would cut off the vacuum from the pocket providing totally unacceptable performance. This is obviated by the present invention.

Figure 4A:
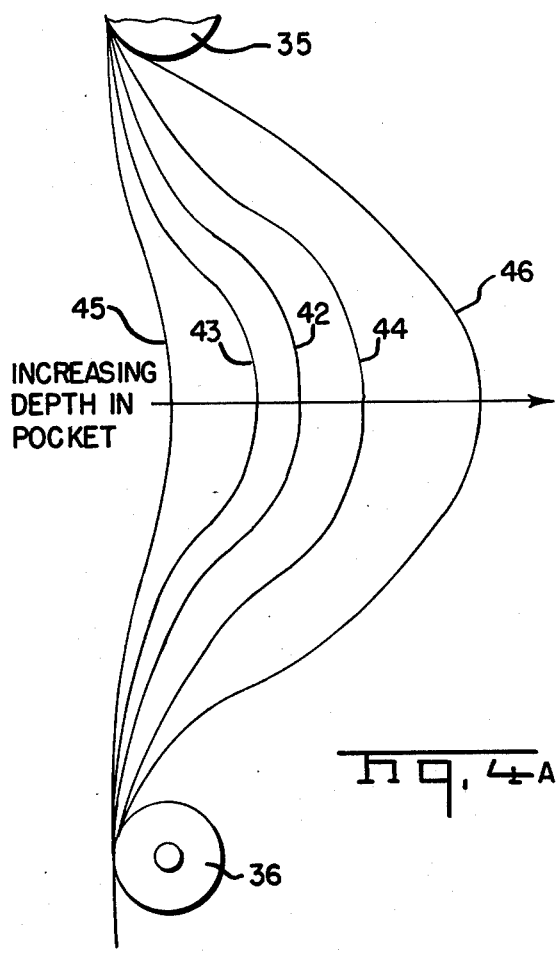
FIG. 4A depicts various tape positions in the isolation pocket corresponding with points on the graph of FIG. 4B.

FIG. 4A depicts the tape in five different positions of depth in the isolation pocket. The steady state running position is indicated at 42. The position of the tape on a forward start is indicated at 43. The position on a reverse start is indicated at 44.

Figure 4B:
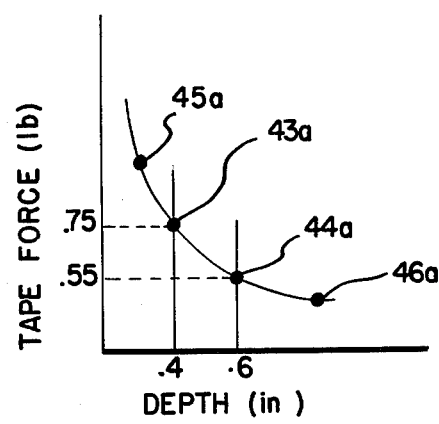
FIG. 4B depicts the tape tension as a function of the depth of the tape in the pocket.

FIG. 4B is a graph of tape tension as a function of depth in the pocket. The tape tension 43a corresponds with tape position 43, that of a forward start. Tape tension 44a corresponds with tape position 44, that of a reverse start. We have found that the provision of low inertia, low friction bearings at the corner of the pocket keeps the tape closer to the steady state running position which, in turn, provides a reduced range of tape tension across the head. This reduced range is shaded in FIG. 4B.

Without the low friction, low inertia bearings, the tape will assume the position indicated at 45 on a forward start and a position indicated at 46 on a reverse start. Corresponding tape tensions are denoted 45a and 46a in FIG. 4B. This is a greatly increased tape tension range compared to that provided by the present invention and will contribute to degraded tape drive performance.

The operation is as follows. The tapering support surfaces provided by support arms 33 and 34 establish a servo action which maintains the position of the tape in the pocket 29 near its steady state running position. This provides a more even tape tension across the head and improves the reproducibility of signal amplitude at the head and inhibits tape slip at the capstan wheel. When the tape is stationary, the vacuum pulls the tape into the isolation pocket 29 to a position at which the forces are in equilibrium. During a forward start, the tape initially moved by the capstan is pulled out of the isolation pocket 29. Then, after several milliseconds, tape from the supply column 21 builds up enough speed so that it enters the isolation pocket 29 faster than it is leaving. Finally, after several more milliseconds this motion transient dies out and the tape attains a steady-state forward running position.

During a backward start tape is initially pushed into the isolation pocket 29 faster than the supply column 21 can respond, and the backward running position of the tape is momentarily deep in the pocket. Within several milliseconds the tape settles into its steady-state backward running position.

The isolation pocket support arms 33 and 34 provide guiding, stabilizing surfaces for the tape when the tape is riding about half-way or deeper in the pocket. The arms act as a mechanical servo to control tape position in the pocket, thus optimizing the isolation pocket performance. As the tape runs deeper into the pocket, less tape area is exposed to vacuum, which results in a reduced force at the pocket. The column, which provides a constant force, pulls the tape out of the pocket, and thus the tape tends to move higher in the pocket seeking equilibrium. If the tape moves too high in the pocket, the force increases in the pocket until the tape pulls from the column allowing tape to move deeper in the pocket. Thus the arms 33 and 34 stabilize the overall tape motion, which helps to keep the tape tension at the read/write head uniform.

Figure 5:
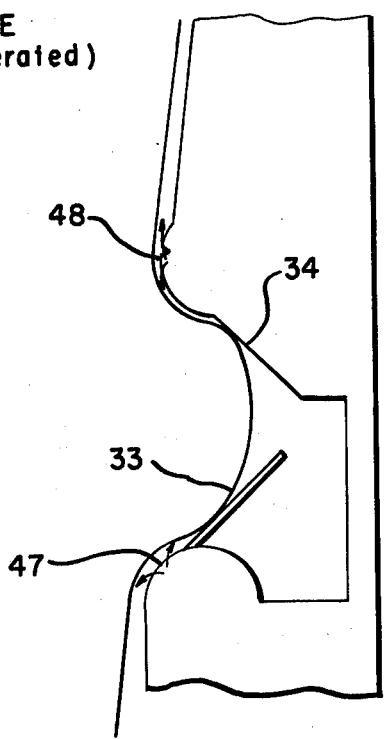
FIG. 5 shows an alternate embodiment employing air bearings.

FIG. 5 shows an alternate embodiment in which air bearings are provided at the top and bottom corners of the isolation pocket. Positive pressure air emanates from the holes 47 and 48 to provide a low friction, low inertia air bearing. The path of the tape is exaggerated in FIG. 5 for clarity.

We claim:

1. A magnetic tape drive comprising:

a supply reel hub and a take-up reel hub rotating about spaced parallel axes disposed one above the other;

two vertical vacuum chambers, one having an opening facing upwardly, adjacent one of said hubs and the other having an opening facing downwardly, adjacent the other of said hubs, each vacuum chamber accommodating a slack loop of the tape adjacent said supply reel hub and said take-up reel hub;

a tape head mounted in the tape path between said hubs;

an isolation pocket having an opening facing toward said hubs, a bottom wall and two side walls; and support arms positioned in said pocket to form support surfaces for magnetic tape, said arms extending from the corners of the opening of said pocket and tapering toward the bottom wall of said pocket.

2. The tape drive recited in claim 1 further comprising:
two low friction, low inertia bearings positioned at the corners of said opening of said pocket.

3. The tape drive recited in claim 2 where one of said bearings includes a barrel roller mounted on roller bearings at the top corner of the opening of said pocket.

4. The tape drive recited in claim 2 wherein at least one of said bearings is a positive pressure air bearing.

5. The tape drive recited in claim 2 where the bearing at the lower corner of the opening of said pocket is a stationary polished barrel.

6. The tape drive recited in claim 1 further comprising:
a glass beaded tape on the surface of said support arm over which magnetic tape moves.

7. The tape drive recited in claim 1 further comprising:
a source of vacuum having an opening disposed between one of said support arms and the wall of said isolation pocket.

* * * * *